United States Patent [19]

Wurzburg

[11] 4,133,025

[45] Jan. 2, 1979

[54] PULSE WIDTH MODULATOR SYMMETRY CORRECTION CIRCUIT AND METHOD THEREOF

[75] Inventor: Henry Wurzburg, Mesa, Ariz.

[73] Assignee: Motorola, Inc., Schaumburg, Ill.

[21] Appl. No.: 837,115

[22] Filed: Sep. 28, 1977

[51] Int. Cl.² ............................................ H02M 7/537
[52] U.S. Cl. .......................................... 363/41; 363/97
[58] Field of Search ........................ 363/24, 25, 41, 97

[56] References Cited

U.S. PATENT DOCUMENTS

| | | | |
|---|---|---|---|
| 3,697,855 | 10/1972 | Kernick et al. | 363/41 |
| 3,710,229 | 1/1973 | Jessee | 363/41 |
| 3,873,903 | 3/1975 | Koetsch et al. | 363/25 |
| 4,005,352 | 1/1977 | Kugler et al. | 363/26 |
| 4,061,957 | 12/1977 | JanVader | 363/24 X |

Primary Examiner—William M. Shoop
Attorney, Agent, or Firm—Robert D. Lott

[57] ABSTRACT

A transformer with a high permeability core is substantially prevented from saturating by a symmetry correction circuit which senses the total flux density change of either a positive or negative polarity and balances the total flux density change of the opposite polarity to thereby provide symmetrical positive and negative changes in the flux density of the transformer. The symmetry correction circuit integrates the voltage from a winding of the transformer to determine the total flux density change of a given polarity during the application of a voltage of one polarity. The duration of the voltage of the opposite polarity is controlled by the symmetry correction circuit such that the net voltage-time integration of the two applied voltages is substantially equal to zero.

9 Claims, 2 Drawing Figures

PULSE WIDTH MODULATOR SYMMETRY CORRECTION CIRCUIT AND METHOD THEREOF

BACKGROUND OF THE INVENTION

This invention relates, in general, to transformer control circuitry, and more particularly to pulse width modulated power supply circuits which utilize output power transformers such as in push-pull output driver circuits.

Pulse width modulated voltage regulators which have output power transformers have several advantages over other types of voltage regulator circuits, one primary advantage being that they utilize transformer coupling to thereby provide output voltage isolation from the unregulated input voltage. Another advantage is that they are more efficient than other types of voltage regulators and are thus used in applications which require relatively large amount of power supply current.

Of particular interest in this application is the output transformer which must pass these large amounts of power to the load. This transformer must transfer the power required without going into saturation. Saturation causes a transformer to lose its transformer action thereby causing the output voltage to drop; and more importantly, saturation of the transformer reduces the back EMF of the transformer to the point where the transformer appears as a short circuit to the driving network. As a result, the driving circuitry, particularly a transistor circuit, can be severely damaged. Preventing the output transformer from going into saturation has been a very troublesome problem in the past and several methods have been employed to prevent this saturation.

The output power transformer is contained within an output driver stage of a pulse width modulated voltage regulator. The driver stage receives pulse width modulated inputs from the voltage regulator and utilizes these inputs to selectively turn on driver transistors which in turn couple an unregulated DC supply voltage to the primary output of the power transformer. Usually, the output driver stage is one of three general types. A first type comprises a push-pull arrangement in which two transistors alternately conduct to gate current through each side of a center tapped primary of the output power transformer. This type of circuit is presented in the principle embodiment of the present application. A second type of circuit consists of a full bridge circuit utilizing four transistors in which two transistors at a time are forced into conduction to allow unregulated power supply current to flow from the positive input through the first transistor, into the primary of the output power transformer, and back through the second transistor to the return of the unregulated DC voltage supply. The direction of the current is reversed when the other two transistors are placed into conduction. The third type of circuit, known as a half bridge circuit, replaces two of the transistors of the full bridge circuit with capacitors.

Of the three types of circuits, the most preferred from an economic standpoint is the push-pull circuit since the full bridge circuit requires twice as many transistors as the push-pull circuit, and the half bridge circuit requires transistors which have twice the current range of the transistors of the push-pull circuit. For high-power applications, for which the pulse width modulator power regulators are best suited, these output transistors are relatively expensive, and their cost is determined to a large extent by the amount of current which they will safely conduct. However, the full bridge and half bridge circuits permit the insertion of expensive capacitors in series with the primary winding of the output power transformer to balance the positive and negative voltages applied to the transformer and thereby significantly reduce the probability of saturation. Thus, circuit designers frequently have selected the half bridge or full bridge circuit together with series capacitors rather than push-pull circuits in order to prevent the saturation of the output power transformer.

Another solution in the past has been to use output power transformers having large air gaps which allow excess magnetic flux density to dissipate between half cycles of the pulse width modulator operation. However, these transformers are both expensive and very large physically and are therefore undesirable. Another method used in the past has been to put inductive chokes in the collectors of the push-pull circuit transistors to current feed the output power transformer and to limit the current to the transformer to prevent the transistors from shorting out. However, these chokes are undesirable in that they require a larger DC unregulated power supply to compensate for the voltage drop across the chokes. Moreover, the chokes themselves are expensive and must be physically large to keep from going into saturation.

Still another method used in the past has been to sense the emitter current of the output driver transistors of the output driver stage and to shut down the regulator when excess current is detected in the emitters. However, this method is unsatisfactory in some cases since, among other reasons, the sensing must be isolated from the regulator in order to preserve the isolation of the unregulated power supply. Also, the amount of time necessary to shut down the regulator is usually several cycles long due to the loop bandwidth of the pulse width modulator, but the shorting mechanism of the transistors caused by the saturation of the output transformer can occur within a single half cycle of the pulse with modulator. Thus, the emitter sensing may be too slow to prevent destruction of the power transistors under certain conditions. Moreover, this method also results in an interruption of the power from the power supply. Finally, sensing the emitter currents provides information about the transformer after it has entered into saturation but does not prevent this saturation from occurring in the first place.

A fourth method of preventing the output tranformer from going into saturation has been to match the positive and negative voltage applied to the transformer by matching the positive and negative characteristics of the pulse width modulator and also by matching the power transistor characteristics. However, this matching has been expensive and generally unsatisfactory since initial room temperature matching does not guarantee matching characteristics over the temperature extremes in which the power supply may operate.

Therefore, it can be appreciated that a symmetry correction circuit which would inhibit saturation of an output power transformer and thereby permit reliable operation of a push-pull type circuit with a pulse width modulated power supply is highly desirable.

SUMMARY OF THE INVENTION

Accordingly, it is an object of this invention to provide a regulator circuit which essentially balances the positive and negative changes in the flux density of a transformer.

It is also an object of this invention to provide a symmetry correction circuit to avoid the necessity of an overly large transformer in a pulse width modulated power supply.

It is also an object of this invention to provide a regulator for a transformer which is integratable with a pulse width modulator circuit on a single semiconductor substrate.

Another object of this invention is to provide a pulse width modulated power supply voltage regulator which does not require matched components in a push-pull output driver circuit.

Yet another object of this invention is to provide a method for essentially balancing the positive and negative changes in the flux density of a transformer.

An illustrated embodiment of the invention provides a regulator circuit for balancing the positive and negative flux density change in an inductive device driven by a voltage of a first polarity and a voltage of a second polarity which comprises first, a detection means which is coupled to the inductive device and which determines the flux density change produced by the voltage of the first polarity and secondly, means coupled to the detection means for controlling the duration of the voltage of the second polarity for balancing the positive and negative flux density change in the inductive device.

Also provided is method for regulating the voltage-time symmetry in an inductive device being driven by a first and second switching means in sequence which apply to the inductive device a voltage of a first polarity and a voltage of a second polarity, respectively. The method comprises the steps of integrating a winding voltage continuously with respect to time such that the voltage of the first polarity and the second polarity each produce a voltage-time product, and controlling the amount of time during which the second switching means applies the voltage of the second polarity to the inductive device such that the voltage-time product derived from the second switching means is equal to the voltage-time product derived from the first switching means.

DESCRIPTION OF THE PREFERRED EMBODIMENT

Figure 1:
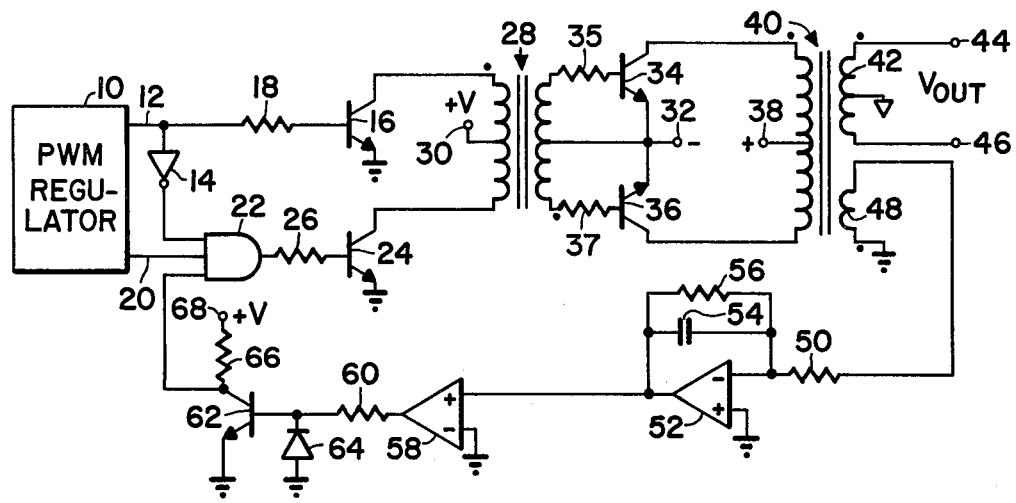
FIG. 1 is circuit diagram illustrating a preferred embodiment of the invention.

FIG. 1 shows a pulse width modulated regulator circuit, shown as block 10, of a common type and well known to one skilled in the art. Pulse width modulator 10 has two outputs, the first appearing at line 12 is connected to the input of an inverter 14 and also to the base of an NPN transistor 16 through an isolation resistor 18. The second output of the pulse width modulator block 10 at line 20 is connected to one input of a three-input AND gate 22 which in turn is connected to the base of an NPN transistor 24 through an isolation resistor 26. The output of inverter 14 is connected to a second input of AND gate 22. The collector of transistor 16 is connected to one end of the primary winding of a transformer 28 which has both a center tapped primary and a center tapped secondary. The collector of transistor 24 is connected to the other end of the primary winding of transformer 28 and the center tap of the primary is connected to a positive supply voltage (not shown) at terminal 30. The emitters of both transistors 16 and 24 are connected to ground potential. The center tap of the secondary of transformer 28 is connected to a terminal 32 for connection to the minus terminal of an unregulated power supply (not shown). One end of the secondary winding of transformer 28 is connected to the base of an NPN power transistor 34 through a current limiting resistor 35 and the other end of the secondary winding of transformer 28 is connected to the base of an NPN power transistor 36 through a current limiting resistor 37. The windings of transformer 28 are polarized such that a positive voltage at the collector of transistor 16 with respect to the collector of transistor 24 induces a positive voltage at the base of transistor 36 with respect to the base of transistor 34. The emitters of transistors 34 and 36 are connected together and also connected to terminal 32. Terminal 38, connected to the positive terminal of the unregulated power supply, is connected to a center tap on the primary of an output transformer 40. The collector of NPN power transistor 34 is connected to one end of the primary winding of transformer 40, and the collector of NPN power transistor 36 is connected to the other end of the primary winding of transformer 40.

Transformer 40 contains two secondary windings. Secondary winding 42 has a center tap which is connected to an isolated ground potential while the two ends of second winding 42 provide the output voltage for the pulse width modulated power supply at terminals 44 and 46. The other secondary winding 48 does not have a center tap but rather one end is connected to ground potential and the other end is fed through a resistor 50 to the minus input of an operational amplifier 52. The polarity of transformer 40 is such that a positive voltage on the primary at the collector of transistor 34 with respect to the primary center tap induces a positive voltage at terminal 44 and a negative voltage at resistor 50. The positive input of operational amplifier 52 is connected to ground potential. The output of the operational amplifier 52 is connected to a capacitor 54 and a resistor 56 which in turn are both connected back to the negative input terminal of operational amplifier 52. The output of the operational amplifier 52 is also connected to the plus input of a comparator 58. The minus input is connected to ground potential, and the output of comparator 58 is coupled through a resistor 60 to the base of an NPN transistor 62 and also to the cathode of a diode 64. The anode of diode 64 is connected to ground potential as is the emitter of transistor 62. The collector of transistor 62 is connected to a resistor 66 which, in turn, is connected to a positive supply voltage (not shown) at terminal 68. Finally, the collector of transistor 62 is also connected to the third input of AND gate 22.

In operation, the pulse width modulated regulator of block 10 receives information about the output voltage produced at transformer 40 from a feedback circuit (not shown) to adjust the width of the output signal appearing at line 12. Also generated within the pulse width modulator circuit 10 is a non-conduction time or dead time appearing at both lines 12 and 20 to inhibit the operation of transistors 16 and 24 between alternate cycles of the regulator to protect from simultaneous conduction of transistors 16 and 24 as is known in the art. The output at line 20 is low during the dead time but remains at a high logic level at other times. A positive voltage at line 12 inhibits AND gate 22 via inverter 14 and also provides base current to transistor 16 through resistor 18 thereby forcing the collector of transistor 16 to a low voltage potential. Voltage then is developed from the center tap of a primary winding of transformer 28 across the upper half of the primary winding to the collector of transistor 16. The voltage developed on the primary of transformer 28 induces a positive voltage at the base of transistor 34 with respect to the center tap of the secondary of transformer 28 which is connected to the emitter of transistor 34. In this manner, the base-emitter junction of transistor 34 is forward biased. Analogously, the base-emitter junction of transistor 36 is reverse biased. A current path is established from terminal 38, the positive terminal of the unregulated power supply, through the center tap of a primary winding of transformer 40 to the collector of transistor 34 and through transistor 34 back to the negative terminal of the unregulated power supply at terminal 32. This current induces a positive voltage at terminal 46 of secondary winding 42 with respect to the isolated grounded center tap and also induces a negative voltage at terminal 44 with respect to the isolated grounded center tap. The voltage induced in the secondary winding 48 causes a positive to negative voltage drop across resistor 50 such that the winding side of resistor 50 is positive with respective to the comparator side of resistor 50. Since operational amplifier 52 has a large amount of gain, its output voltage will swing in a direction to keep the voltage between the positive input and the negative input essentially equal to zero. Also, since the input impedance is relatively high, the output voltage of operational amplifier 52 will go low to allow capacitor 54 to absorb the current flowing through resistor 50. Although resistor 56 is in parallel with the capacitor 54, its impedance is much greater than the dynamic impedance of capacitor 54 and for the moment can be ignored. However, since the current flowing through a capacitor is constant only when the voltage across the capacitor is changing, the output voltage of operational amplifier 52 must be changing in a constant rate to compensate for a constant current flowing through resistor 50. Thus, a constant output voltage at secondary winding 48 results in a constantly changing voltage at the output of operational amplifier 52 and in a constantly changing charge on capacitor 54. Therefore, operational amplifier 52, capacitor 54, and resistor 50 operate as an integrating means to provide an integration of a voltage appearing at secondary winding 48 with respect to time. Thus, the voltage appearing at the output of operational amplifier 52 is a voltage-time product of the voltage appearing at the secondary winding 48. Resistor 56 operates to bleed charge from capacitor 54 during periods when the regulator is turned off so that when the regulator starts up again, the capacitor will be uncharged.

The voltage at the output of operational amplifier 52 is in turn fed into the positive input of comparator 58 to be compared to a reference voltage at the negative input terminal of comparator 58. In this embodiment this voltage is ground reference potential although it would be possible to provide either a constant reference voltage other than ground or to provide a voltage at this reference which would vary with respect to certain other circuit parameters. Since the positive input of comparator 58 is more negative than the negative input of comparator 58 during the first half cycle of operation, the output of comparator 58 goes to a negative voltage thereby reverse biasing the base-emitter junction of transistor 62, and the collector of transistor is pulled high by the supply voltage at terminal 68. Diode 64 conducts to protect the base-emitter junction of transistor 62 from entering the breakdown region. Thus, the three inputs to AND gate 22 are a) low from inverter 14, b) high from line 20, and c) high from the collector of transistor 62 during the first half of the pulse width modulator power supply cycle. When the output at line 12 goes low, inverter 14 produces a high input to AND gate 22, but AND gate 22 is prevented from going high by the dead time appearing at line 20. During this dead time neither transistor 16 or 24 is conducting and capacitor 54 of the integrator is holding the charge from the first half cycle.

After the dead time, all three inputs to AND gate 22 are at the high state thereby producing a high output from AND gate 22 to, in turn, provide base drive to transistor 24. Analogous to the current paths and voltage polarities produced during the first half of the cycle, transistor 24 conducts and induces voltages in transformer 28 to force transistor 36 into conduction which in turn induces a negative voltage across resistor 50. Thus, the output of operational amplifier 52 increases at a constant rate and thereby decreases the charge on capacitor 54. The output voltage of operational amplifier 52 increases from the negative voltage present at the end of the first cycle until it reaches zero volts at which time comparator 58 switches states to produce a high voltage level at its output and in turn force transistor 62 into conduction. When transistor 62 comes into conduction, the collector drops to a saturation voltage which turns off AND gate 22 and ends the second half cycle of the pulse width modulated power supply. Thus, the voltage-time integration of the two half cycles are equal to each other to produce a symmetrical voltage-time excitation on output transformer 40.

Although secondary winding 48 has been used in FIG. 1 to produce the winding voltage for the symmetry correction circuit, it will be understood that any winding, including the primary winding, could be used as an input to the symmetry correction circuit.

Figure 2:
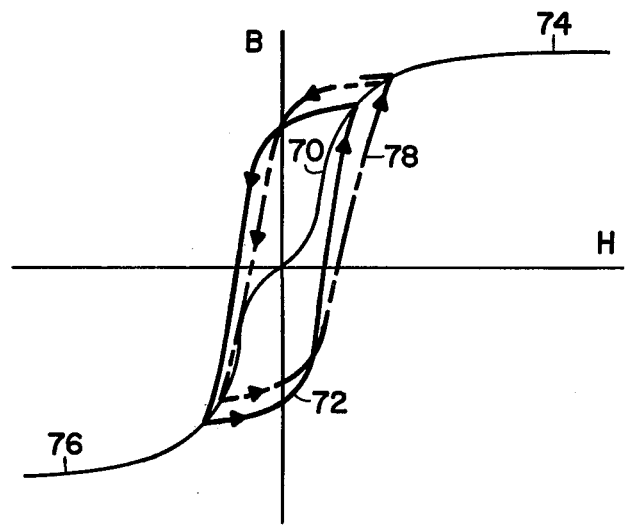
FIG. 2 is a magnetization curve of a ferromagnetic material for illustrating the operation of the invention.

FIG. 2 is a magnetization curve of a ferromagnetic material which serves to illustrate the operation and advantages of the invention. The ferromagnetic material provides a high permeability core for a transformer. The vertical axis represents the flux density in the ferromagnetic material and is expressed in units of webers per square meter. The flux density, also referred to as the B field, is proportional to the time integral of the voltage impressed on the material. The horizontal axis is the magnetic field, H, having units of amps per meter and is also referred to as the magnetizing force. The H field is proportional to the current flowing in the windings around the ferromagnetic material. The S-shaped curve 70 is a magnetization curve for a ferromagnetic material exhibiting no hysteresis. Curve 72 is a magnetization curve followed by a typical transformer which has symmetrical positive and negative deviations in the flux density and symmetrical positive and negative changes in the magnetic field H. It is desirable that the transformer operate along this balanced magnetization curve 72 since the largest deviations in the flux density and also in the magnetic field H can be accommodated without entering into the saturation region shown by areas 74 and 76. When the ferromagnetic material is in the saturation region, further increases in the magnetization field H produces no increase in the flux density which in turn means that there is no more induced EMF or back EMF. At this point, the transformer looks like a short circuit, except for the winding resistance, to the input and output circuitry. In the circuit shown in FIG. 1 the output transformer 40 is voltage fed from the unregulated power supply voltage appearing at terminals 32 and 38 and thus the B field is forced to change at a constant rate. The transformer core operates along the magnetization curve at constant rate in a vertical direction with respect to time. If the positive voltage-time integral and the negative voltage-time integral are not equal, then the core of the transformer will not return to its original place on the hysteresis curve, but will rather tend to either increase as shown by curve 78 or decrease with each cycle of operation. Thus, unless there is some sort of compensation, the transformer curve will rapidly advance along the S curve 70 until saturation region 74 or 76 is reached causing a degradation or possibly failure of the power supply. Therefore, some sort of regulation or compensation is desirable to balance the positive voltage-time product and the negative voltage-time product for each cycle of the regulator. Thus, the circuit shown in FIG. 1 serves to monitor the change in the flux density during the first half cycle of the operation of the power supply, and the comparator and feedback circuit control the operation of the second half of power supply to produce a balanced change in the flux density in the transformer during each cycle of operation.

It is seen that the regulator circuit of the principle embodiment obviates the necessity of matching characteristics or of other methods of producing voltage-time symmetry in the output transformer. Moreover, the need for large transformers with large air gaps to provide wide operating margins along the magnetization curve required by past regulators has been substantially reduced. Smaller transformers which tranfer the same amount of power are possible since the symmetry correction circuit permits the utilization of much more of the magnetization curve. That is the core operates closer to the saturation regions on the curve. It is also possible to integrate on a single semiconductor substrate the regulator circuit of the principle embodiment along with the pulse width modulator circuit 10 of FIG. 1. Finally, although the principle embodiment is shown for output transformer, the present invention is applicable to any pulse width modulated transformer or any pulse width modulated inductive device as for example an inductor used to produce a high intensity magnetic field.

While the invention has been particularly shown and described with reference to the preferred embodiment shown, it will be understood by those skilled in the art that various changes may be made therein without departing from the teachings of the invention. Therefore, it is intended in the appended claims to cover all such equivalent variations as come within the spirit and scope of the invention.

What is claimed is:

1. A regulator circuit for balancing the positive and negative flux density change in an inductive device driven by a voltage of a first polarity and a voltage of a second polarity comprising:
    (a) detecting means coupled to said inductive device for determining the flux density change produced by said voltage of said first polarity; and
    (b) means coupled to said detection means for controlling the duration of said voltage at said second polarity for balancing the positive and negative flux density change in said inductive device.

2. A circuit for applying a symmetrical voltage-time product waveform to an inductive device comprising:
    (a) first switch means for applying a voltage of a first polarity to said inductive device for a first half cycle of operation;
    (b) second switch means for applying a voltage of a second polarity to said inductive device for a second half cycle of operation;
    (c) integrating means coupled to said inductive device for providing a voltage representative of the integral with respect to time of a voltage applied to said inductive device during said first half cycle of operation; and
    (d) means responsive to said integrating means and coupled to said second switch means for controlling the duration of said second half cycle of operation, said integral with respect to time for said first half cycle and said second half cycle being equal for each full cycle.

3. A symmetry correction circuit for balancing the positive and the negative flux density in an inductive device being driven alternately with a voltage of a first polarity and with a voltage of a second polarity comprising:
    (a) sensing means coupled to said transformer for providing an output voltage proportional to the voltage impressed on the primary of the transformer;
    (b) integration means for receiving said output voltage and for integrating said output voltage over time to produce an analog voltage proportional to said integration, said analog voltage increasing when a voltage of a first polarity is present on a winding of said inductive device and decreasing when a voltage of a second polarity is present on said winding of said inductive device;
    (c) comparison means for determining when said analog voltage is equal to a reference voltage; and
    (d) control means coupled to said comparison means for controlling the duration of application of the voltage of said second polarity applied to said winding of said inductive device.

4. A symmetry correction circuit for use in a pulse width modulated power supply having a first switching means for applying a voltage of a first polarity onto a winding of a transformer, and a second switching means for applying a voltage of an opposite polarity onto said winding of said transformer, said first switching means have a conduction time determined principally by an output voltage of said power supply, said symmetry correction circuit comprising:
    (a) integrating means coupled to a winding of said transformer for providing an output voltage which is equal to the voltage-time integral of the voltage applied to said winding;
    (b) comparison means for determining when said output voltage of said integrating means is equal to a reference voltage; and
    (c) control means coupled to said second switching means, said control means being responsive to said comparison means for controlling the conduction time of said second switching means such that the voltage-time integration of said winding voltage during the conduction time of said first switching means is equal to the voltage-time integral with said winding voltage during the conduction time of said second switching means.

5. A regulator circuit for use with a transformer being driven by a first and second switching means which apply a voltage of a first polarity and a voltage of a second polarity respectively to a primary winding of said transformer comprising:
   (a) an integrator coupled to said transformer, said integrator comprising a capacitor which is charged with a polarity determined by, and at a rate proportional to, a voltage on a winding of said transformer, said integrator having an analog output voltage proportional to the charge of said capacitor;
   (b) a comparator coupled to said integrator for comparing said analog output voltage to a reference voltage and for indicating when said analog voltage is equal to said reference voltage; and
   (c) a controller responsive to said integrator for setting the duration that said second switching means applies voltage to said primary winding of said transformer.

6. A transformer anti-saturation circuit for use with a transformer driven by a first switching means for applying a voltage of a first polarity to a primary winding of said transformer for a first period of time determined primarily by an output voltage of said power supply, and driven by a second switching means for applying a voltage of a second polarity to said primary winding for a second period of time, said anti-saturation circuit comprising:
   (a) integrating means coupled to a secondary winding of said transformer for providing an analog voltage proportional to the voltage-time integral of a voltage appearing at said secondary winding;
   (b) comparison means coupled to said integrating means for determining when said analog output voltage is equal to a reference voltage; and
   (c) control means responsive to said comparison means and coupled to said second switching means for conrolling the duration of said second period of time.

7. A method for regulating the voltage-time symmetry in an inductive device being driven by a first and second switching means in sequence which apply to the inductive device a voltage of a first polarity and a voltage of a second polarity respectively, comprising:
   (a) integrating a winding voltage continuously with respect to time such that the voltage of the first polarity and the voltage of the second polarity each produce a voltage-time product; and
   (b) controlling the amount of time during which the second switching means applies voltage of the second polarity to the inductive device such that the voltage-time product derived from the second switching means is equal to the voltage-time product derived from the first switching means.

8. A method of substantially preventing a ferromagnetic transformer from going into saturation which is being driven alternately by a voltage of a first polarity and a voltage of a second polarity which comprises:
   (a) integrating a voltage with respect to time appearing at a winding of the transformer to produce an integration result;
   (b) comparing said integration result to a reference voltage; and
   (c) terminating the application of a voltage of one polarity to the transformer when said integration result is equal to said reference voltage.

9. A method for regulating the voltage-time symmetry in an inductive device being driven by a first and second switching means in sequence which apply a voltage of a first polarity and a voltage of a second polarity, respectively, which comprises:
   (a) sensing a winding voltage appearing at one winding of said inductive device;
   (b) integrating said winding voltage continuously with respect to time such that a voltage of said first polarity produces an increasing charge on a capacitor and a voltage of said second polarity diminishes said charge on said capacitor;
   (c) comparing the charge on said capacitor to a reference voltage; and
   (d) controlling the amount of time during which said second switching means applies a voltage of said second polarity to said inductive device such that said second switching means becomes non-conductive when a charge on said capacitor is equal to said reference voltage.

* * * * *